(12) United States Patent
Geerts

(10) Patent No.: US 11,325,064 B2
(45) Date of Patent: May 10, 2022

(54) DEVICE AND METHOD TO DRY A DAMP COMPRESSED GAS AND A COMPRESSOR INSTALLATION PROVIDED WITH SUCH A DEVICE

(71) Applicant: ATLAS COPCO AIRPOWER, NAAMLOZE VENNOOTSCHAP, Wilrijk (BE)

(72) Inventor: Bart Geerts, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 249 days.

(21) Appl. No.: 16/621,869

(22) PCT Filed: Jun. 4, 2018

(86) PCT No.: PCT/IB2018/053971
§ 371 (c)(1),
(2) Date: Dec. 12, 2019

(87) PCT Pub. No.: WO2018/229593
PCT Pub. Date: Dec. 20, 2018

(65) Prior Publication Data
US 2020/0122082 A1     Apr. 23, 2020

(30) Foreign Application Priority Data
Jun. 16, 2017    (BE) .................... 2017/5430

(51) Int. Cl.
*B01D 53/22* (2006.01)
*B01D 53/14* (2006.01)
(Continued)

(52) U.S. Cl.
CPC ....... *B01D 53/229* (2013.01); *B01D 53/1425* (2013.01); *B01D 53/263* (2013.01);
(Continued)

(58) Field of Classification Search
None
See application file for complete search history.

(56) References Cited

U.S. PATENT DOCUMENTS

| | | | | |
|---|---|---|---|---|
| 2004/0099140 A1* | 5/2004 | Hesse | .................. | B01D 53/268 96/8 |
| 2014/0238057 A1* | 8/2014 | Kandil | ................. | B01D 53/263 62/94 |
| 2015/0211754 A1* | 7/2015 | Warmerdam | ........ | B01D 53/268 62/271 |

FOREIGN PATENT DOCUMENTS

| | | |
|---|---|---|
| EP | 0 678 321 A2 | 10/1995 |
| JP | 10-192658 A | 7/1998 |

(Continued)

OTHER PUBLICATIONS

Written Opinion of the International Searching Authority of PCT/IB2018/053971 dated Aug. 21, 2018.
(Continued)

*Primary Examiner* — Jason M Greene
(74) *Attorney, Agent, or Firm* — Sughrue Mion, PLLC

(57) ABSTRACT

Device to dry a damp compressed gas, whereby the device (2) is provided with a dryer that is provided with a liquid desiccant and configured to bring compressed gas in contact with the aforementioned desiccant that is capable of absorbing moisture from the compressed gas, characterised in that the dryer is a membrane dryer (11); the device (2) to dry compressed gas contains a circuit (20) in which the aforementioned liquid desiccant is placed and means to allow the circulation of the desiccant in the circuit (20), consecutively through the membrane dryer (11) with a membrane (13) that forms a partition between the compressed, gas on one side and the liquid desiccant on the other side of the membrane (13), whereby the membrane (13) is impermeable or virtually impermeable to the gas in the compressed gas but
(Continued)

selectively permeable to the moisture in the compressed gas; a heat exchanger (29) to heat up the liquid desiccant; a regenerator (22) used to remove at least partially the moisture absorbed in the liquid desiccant before this is returned through the membrane dryer (11) for a following cycle, whereby the regenerator (22) is formed by a housing (23) through which the liquid desiccant with the moisture absorbed therein is guided in moisture-transfer contact with a flushing agent that is simultaneously guided through the housing (23) and is capable of absorbing moisture from the liquid desiccant upon contact; and the circuit (20) is provided with a closable bypass (45) between a branching point in the circuit downstream from the regenerator (22) and upstream from the membrane dryer (11) and a confluence point in the circuit downstream from the membrane dryer (11) and upstream from the regenerator (22).

19 Claims, 4 Drawing Sheets

(51) Int. Cl.
*B01D 53/26* (2006.01)
*B01D 53/28* (2006.01)

(52) U.S. Cl.
CPC ......... *B01D 53/265* (2013.01); *B01D 53/268* (2013.01); *B01D 53/28* (2013.01); *B01D 2053/221* (2013.01); *B01D 2252/10* (2013.01); *B01D 2252/2023* (2013.01)

(56) References Cited

FOREIGN PATENT DOCUMENTS

| WO | 02/44624 A1 | 6/2002 |
| WO | 2014/038934 A1 | 3/2014 |
| WO | 2015/132809 A1 | 9/2015 |

OTHER PUBLICATIONS

Written Opinion of the International Preliminary Examining Authority of PCT/IB2018/053971 dated May 15, 2019.
International Preliminary Report on Patentability of PCT/IB2018/053971 dated Sep. 17, 2019.
International Search Report of PCT/IB/2018/053971 dated Aug. 21, 2018.

\* cited by examiner

DEVICE AND METHOD TO DRY A DAMP COMPRESSED GAS AND A COMPRESSOR INSTALLATION PROVIDED WITH SUCH A DEVICE

CROSS REFERENCE TO RELATED APPLICATIONS

This application is a National Stage of International Application No. PCT/IB2018/053971 filed Jun. 4, 2018, claiming priority based on Belgian Patent Application No. 2017/5430 filed Jun. 16, 2017.

BACKGROUND OF THE INVENTION

Field of the Invention

The present invention relates to a device to dry a damp compressed gas, for example originating from a compressor element.

Background

It is known that the gas sucked in by a compressor element, for example damp ambient air, is also charged with a quantity of moisture in the form of water vapour following compression.

The moisture in the compressed gas can cause damage to the consumers of compressed gas supplied by the compressor.

For this reason, compressed gas is typically dried before being supplied to such consumers.

The invention is, however, not limited to the drying of compressed air charged with water vapour.

Various types of devices to dry a compressed gas are already known.

The present invention relates more particularly to a type of device that is provided with a dryer in which the compressed gas is brought into contact with a desiccant that is capable of extracting moisture from the compressed gas and absorbing it.

Such type of devices are already known whereby a liquid desiccant is atomized in a flow of compressed gas to be dried in order to thus remove the moisture from the gas, after which the desiccant is collected to be removed together with the absorbed moisture or to be treated in order to regenerate the desiccant, in other words to recover the absorbed moisture in order to be able to reuse the desiccant for drying.

A disadvantage of such types of device is the direct contact between gas and liquid. As it is impossible to perfectly separate liquid and gas, liquid desiccant is inevitably taken along with the dried gas and, reversely, compressed gas is also taken along in the liquid desiccant, which in both cases causes a loss and reduces the capacity of the desiccant to absorb moisture.

Another disadvantage is that, any pollution in the gas can also end up in the desiccant and even accumulate, which means that the desiccant must be replaced prematurely.

Another disadvantage is that such a method cannot be applied at 100% ambient relative humidity.

Other types of devices are already known whereby use is made of a membrane that is selectively permeable to the moisture in the compressed gas, whereby the compressed gas to be dried flows on the one side of the membrane and whereby on the other side of the membrane a flushing gas is used that takes along the moisture that is allowed through in its flow.

A disadvantage of this type of drying device is that it is typically rather ineffective.

SUMMARY OF THE INVENTION

The invention relates to a relatively simple device to dry a damp compressed gas in a cost effective and efficient manner.

Gas may refer in this case to a more or a less pure gas such as $N_2$, $O_2$, $CO_2$ or a noble gas such as He or Ar, or a gas mixture, such as air for example.

To this end, the invention relates to a device that is provided with a dryer in which the compressed gas is brought into contact with a desiccant that is capable of absorbing moisture from the compressed gas, characterised in that the dryer is a membrane dryer;

the device to dry compressed gas contains a circuit in which a liquid desiccant is circulated, consecutively through the membrane dryer with a membrane that separates the compressed gas on the one side and the liquid desiccant on the other side of the membrane, whereby the membrane is entirely or as good as impermeable to the gas in the compressed gas but selectively permeable to the moisture in the compressed gas and whereby the pressure on the side of the compressed gas is equal or greater than the pressure on the side of the liquid desiccant; a heat exchanger for heating the liquid desiccant; a regenerator to at least partly remove the moisture absorbed in the liquid desiccant before this is resent for a following cycle through the membrane dryer, whereby the regenerator is formed by a housing where the liquid desiccant containing the absorbed moisture is brought into contact for the purposes of moisture transfer with a flushing agent that is simultaneously led through the housing and is capable of absorbing the moisture from the liquid desiccant; and the circuit is provided with a closable bypass between a branching point in the circuit downstream from the regenerator and upstream from the membrane dryer and a confluence point in the circuit downstream from the membrane dryer and upstream from the regenerator.

Such a device according to the invention provided with a dryer with a membrane and a liquid desiccant can offer many advantages, including the fact that:

moisture can be removed without the compressed gas needing to be cooled to the dew point of water;

such a device can operate without part of the compressed gas being required for use in regenerating the liquid desiccant;

such a device can operate without the use of coolants which, if released, may have a negative impact to a smaller or larger extent on the ozone layer and/or may contribute to what is known as global warming and/or to a lesser or greater extent can be harmful to health;

the amount of moisture that is removed from the compressed gas can be easily adjusted and in many different ways, for example by adjusting the flow of the liquid desiccant, so that the dew point of the dried compressed gas can be freely chosen over a wide range, typically from a dew point of approximately −20° C. to a dew point of approximately 10° C.;

the device can be used within a large pressure domain of the compressed gas;

there is no direct contact between the gas to be dried and the liquid desiccant;

energy recovery is made possible, including recovery of residual heat at a low temperature, such as for example residual heat from the compressor, in particular also from a liquid-injected compressor, for example a water-injected or oil-injected compressor, whereby the temperature of the water, or oil respectively only rises to a limited extent in the compressor;

the device has a simple structure without moving parts, except perhaps one or several pumps and/or blowers, ventilators or fans, which means the device can operate more quietly and requires little maintenance;

the device is very reliable;

the device, depending on the type of membrane, is suitable or can be made suitable for oil-injected compressors whereby a small amount of oil can also be present in the compressed gas.

The liquid desiccant is preferably highly hygroscopic and characterized by a water vapour pressure that is lower than the vapour pressure of the moisture in the compressed gas to be dried.

The liquid desiccant preferably also features one or more of the following characteristics: non or virtually non-toxic; non or virtually non-corrosive; low viscosity and stable.

The liquid desiccant preferably has a viscosity lower than 250 centipoise at 10° C., and more preferably lower than 200 centipoise and most preferably lower than 150 centipoise. A low viscosity simplifies the process of pumping round the desiccant in a circuit, allows the pressure drop to be limited as it flows through the membrane dryer and/or the regenerator and gives a better performance for both drying and regeneration by replacing the desiccant more quickly.

The toxicity of the liquid desiccant is preferably categorized under the Hodge and Sterner scale as class 4 (lightly toxic), or higher, preferably in class 5 (virtually non-toxic) or higher. For the definition of this scale, see "Green chemistry—an introductory text—3rd edition" by Mike Lancaster, p. 20, 1.6 Measuring toxicity, ISBN 978-1-78262-294-9.

The liquid desiccant for use in a device according to the invention preferably contains one or more of the following listed substances and possibly water:

mono-propylene glycol, or MPG for short;
dipropylene glycol, or DPG for short;
tripropylene glycol, or TPG for short;
mono-ethylene glycol, or MEG for short;
di-ethylene glycol, or DEG for short;
tri-ethylene glycol, or TEG for short;
lithium chloride with chemical formula LiCl;
lithium bromide with chemical formula LiBr;
calcium chloride with chemical formula CaCl2.

Additives may be added to the desiccant to increase the stability, for example by preventing and/or slowing down certain degradation processes, such as for example oxidation. Additives may also be added to the desiccant, such as for example corrosion inhibitors, to prevent or limit the deterioration and/or degradation of those materials in the device that come into contact with the desiccant.

The most suitable material for the membrane in the membrane dryer is a hydrophobic material that is practically pore-free, in order to avoid that the pores become saturated with liquid desiccant.

Other suitable materials include those with a microporous structure with pores ranging in size from between fifteen nanometres and one hundred nanometres.

Materials from the following non-exhaustive list may be used as a material for the membrane in the membrane dryer:

polypropene, or PP for short;
polytetrafluoroethene, or PTFE for short;
polyvinylidene fluoride, or PVDF for short;
polyethersulfone, or PES for short;
polyetherimide, or PEI for short;
polyethene, or PE for short;
polydimethylsiloxane, or PDMS for short;
polyimide, or PI for short.

Ceramic materials, such as for example $TiO_2$, may also be used as a material for the membrane in the membrane dryer, as well as combinations of ceramic and plastic materials.

All these materials may or may not be to a greater or lesser extent microporous.

Preferably, the time taken for the compressed gas to pass through the membrane dryer is kept as short as possible, whereby the membrane dryer is preferably composed of a housing with an input for the gas to be dried and an output for the dried gas and a separate compartment in the housing with an input and output for the liquid desiccant and of one or more tubular membranes extending across said compartment and which connect the input and the output for the gas to be dried.

In this way, a large membrane surface is formed across which the moisture in the compressed gas can penetrate to the liquid desiccant whereby the necessary contact time is reduced compared to a smaller membrane surface. In this way, the membrane dryer can also be made more compact.

Better still is a membrane structure whereby the tubular membranes are formed by hollow fibres, for example from a hydrophobic material that has virtually no pores, allowing an even greater membrane surface to be created and the required contact time to be reduced even further and the membrane dryer to be made even more compact.

Furthermore, such a membrane structure with tubular membranes formed with hollow fibres is better able to resist the pressure of the liquid desiccant which prevents it from bending.

Such a membrane structure with tubular membranes formed with hollow fibres is mostly a better choice than a flat membrane skin, although in some case a flat membrane skin is recommended because such flat membrane skins may cause less load losses and are easier to produce.

The invention also relates to a compressor installation with at least one compressor element for the compression of gas, whereby the compressor installation contains a device according to the invention to dry compressed gas originating from the compressor element.

In this case, cost effective use can be made of the residual heat from the compressor element to heat or preheat the liquid desiccant in the aforementioned heat exchanger upstream from the regenerator.

In this way, no or less external heat is required for regeneration and the residual heat, which otherwise tends to be lost, is used in a useful matter and energy can be recovered.

To be specific, residual heat from the compressor element can be used to heat or preheat the liquid desiccant by consecutively guiding a cooling medium through a cooling jacket in the compressor element and the aforementioned heat exchanger.

When an aftercooler is provided after the compressor element to cool the compressed gas, part of the heat removed in this aftercooler can be used to warm the liquid desiccant. This can be, for example, by consecutively guiding a cooling medium through the aftercooler and the aforementioned heat exchanger. For example, this can also be by blowing ambient air that has been warmed by the aftercooler across part of the circuit of the desiccant downstream from the membrane dryer and upstream from the regenerator.

If the desiccant cannot be warmed to a sufficiently high temperature with the residual heat from the compressor element in order to reach the required regeneration, it is also possible to use other and/or additional heat sources to do so, such as for example electric heating, a heat network, for example a steam network, or residual heat from another process.

The invention can also be used with a compressor installation with at least one oil-injected compressor element by choosing membranes made from materials that are insensitive or virtually insensitive to the presence of oil in the compressed gas to be dried and/or by reducing the amount of oil in the compressed gas to a level that causes no problem for the membranes used by using oil separators and/or filters.

Membranes that are to a lesser or larger extent sensitive to the presence of oil, such as for example membranes from microporous plastic, such as for example PP, PE, PEI, PES, PI, PDMS, PTFE of PVDF, can be made insensitive or less sensitive to the presence of oil with the application of a protective layer, for example an oil-repellent or oil-proof layer, for example by applying a protective layer in silicone or an amorphous protective layer made of a fluoropolymer, which is particularly recommended in the case of a membrane made from microporous PTFE.

An oil-injected compressor element always contains an oil circuit allowing oil to be injected in the compressor element, whereby the injected oil is separated from the compressed gas and cooled before being injected back into the compressor element.

In this case, the oil circuit is preferably guided through the aforementioned heat exchanger to cool the oil whilst simultaneously heating the liquid desiccant by recovering the heat from the oil.

The aforementioned heat exchanger can also be made in such a way that at least part of the gas compressed by the compressor element releases heat, whether directly or indirectly, for example using another medium for heat exchange, to the liquid desiccant and whereby the compressed gas is simultaneously cooled.

In the device for drying gas, a pressure difference is preferably applied between both sides of the membrane in the membrane dryer that is greater than two bar, preferably greater than three bar and even more preferably greater than four bar.

Hereto, ambient air can be used beneficially in the regenerator as a flushing gas that is brought into contact with the liquid desiccant to be regenerated at a pressure of around atmospheric pressure.

In this way, a low pressure can be used in the circuit of the liquid desiccant of around atmospheric pressure.

According to a preferred characteristic of the device to dry gas, the regenerator is a regenerator with a membrane with the liquid desiccant on one side and with the aforementioned flushing gas on the other side, whereby the membrane is impermeable or virtually impermeable to the liquid desiccant but selectively permeable to the moisture that is absorbed in the dryer by the liquid desiccant.

The membrane in the regenerator is preferably made from a hydrophobic material.

The material of the membrane in the regenerator contains preferably one or more materials from the following non-exhaustive list:
  polypropene, or PP for short;
  polytetrafluoroethene, or PTFE for short;
  polyvinylidene fluoride, or PVDF for short,
  whereby PTFE and PVDF are the most preferred, since both materials are known for their chemical and thermal stability.

Ceramic materials, such as for example $TiO_2$, may also be used as a material for the membrane in the regenerator, as well as combinations of ceramic and plastic materials.

In this case, a protective layer may also be applied that is either oil-repellent or oil-proof.

In this case, the membrane can also be composed of tubular membranes, for example in the form of hollow fibres.

Rather than flushing gas, it is also possible to use water to regenerate the liquid desiccant. Provided a good choice is made in the combination of liquid desiccant and membrane in the regenerator, it is also possible for water to remove moisture from the desiccant in the regenerator. The advantage of this is that the removed moisture can be collected rather than carried away with the flushing gas.

The desiccant can also be regenerated by blowing air through it. As they pass through the desiccant, air bubbles will absorb part of the moisture in the desiccant in the form of water vapour. Therefore, when the air bubbles escape from the desiccant, air with water vapour can be carried away. In the circuit of the desiccant, a vessel is preferably provided, in which 'wet' desiccant can be added and from which 'drier' desiccant can be carried away, and which is provided with means to blow in air, preferably at the base of the vessel and in the form of fine bubbles, and which is provided with means to allow the bubbles to escape in the form of damp air. A blower or ventilator may be used to blow in the air. Preferably the air will be filtered before blowing it in, in order to limit or better still prevent any pollution of the desiccant.

The circuit of the liquid desiccant can be provided in a cost effective manner with a cooler downstream from the regenerator and upstream from the membrane dryer whereby the absorption capacity of the liquid desiccant in the membrane dryer is increased. This cooler can, for example, be cooled by a ventilator blowing ambient air across it or can be connected to a cooling circuit that may be available.

The liquid desiccant originating from the membrane dryer can be buffered in a buffer vessel in which it can be warmed more stably to a desired temperature by allowing it to continuously circulate through the aforementioned heat exchanger.

Analogously, the liquid desiccant originating from the regenerator can also be buffered in a buffer vessel for more stable cooling.

The circuit of the liquid desiccant is preferably provided with a deaerator, allowing gas that has leaked into the liquid desiccant from the compressed gas through the membrane in the membrane dryer or via other leakages, such as an imperfect seal, to be removed from the circuit, as this may otherwise adversely affect the exchange of moisture from the compressed gas or cause disruptions in the circuit.

As an option, the circuit may be provided with a closable bypass between a branching point in the circuit downstream from the regenerator and upstream from the membrane dryer and a confluence point in the circuit downstream from the membrane dryer and upstream from the regenerator, whereby the valve can be opened when starting up the device in order to become operational more quickly.

The invention also relates to a method to dry a damp compressed gas which uses a device or a compressor installation according to the invention.

More generally, the invention also relates to a method to dry a damp compressed gas comprising the following steps:
  providing a membrane dryer with a membrane that is
    impermeable or virtually impermeable to the gas in the compressed gas but selectively permeable to the moisture in the compressed gas;

allowing the circulation of a liquid desiccant through the membrane dryer on one side of the membrane that is capable of absorbing moisture from the compressed gas to be dried upon contact;

sending the gas to be dried along the other side of the membrane through the membrane dryer at a pressure that is higher than the pressure on the side of the liquid desiccant;

heating the liquid desiccant after it has been guided through the membrane dryer; and, regenerating the liquid desiccant to remove at least some of the moisture absorbed therein before it is recirculated in a following cycle through the membrane dryer by bringing it in contact with a flushing agent that is capable of absorbing moisture from the liquid desiccant upon contact.

The chosen flushing agent will preferably be a flushing gas that contains air and is brought into contact with the liquid desiccant to be regenerated.

Air has the advantage that it is freely available and costs nothing.

The liquid desiccant will preferably first be cooled after regeneration before being sent back to the membrane dryer to dry compressed gas.

In this way, the liquid desiccant in the membrane dryer can be more efficient in absorbing moisture from the gas to be dried.

Using a method according to the invention, a dew point of the dried compressed gas can be achieved that lies between −20° C. and +10° C.

BRIEF DESCRIPTION OF THE DRAWINGS

With the intention of better showing the characteristics of the invention, some preferred embodiments of a device and a method according to the invention to dry compressed gas as well as a compressor installation provided with such a device are described hereinafter by way of an example without any limiting nature, with reference to the accompanying drawings, in which.

the FIGS. 2 to 6 each show a different variant of a device according to the invention.

DETAILED DESCRIPTION OF THE INVENTION

Figure 1:
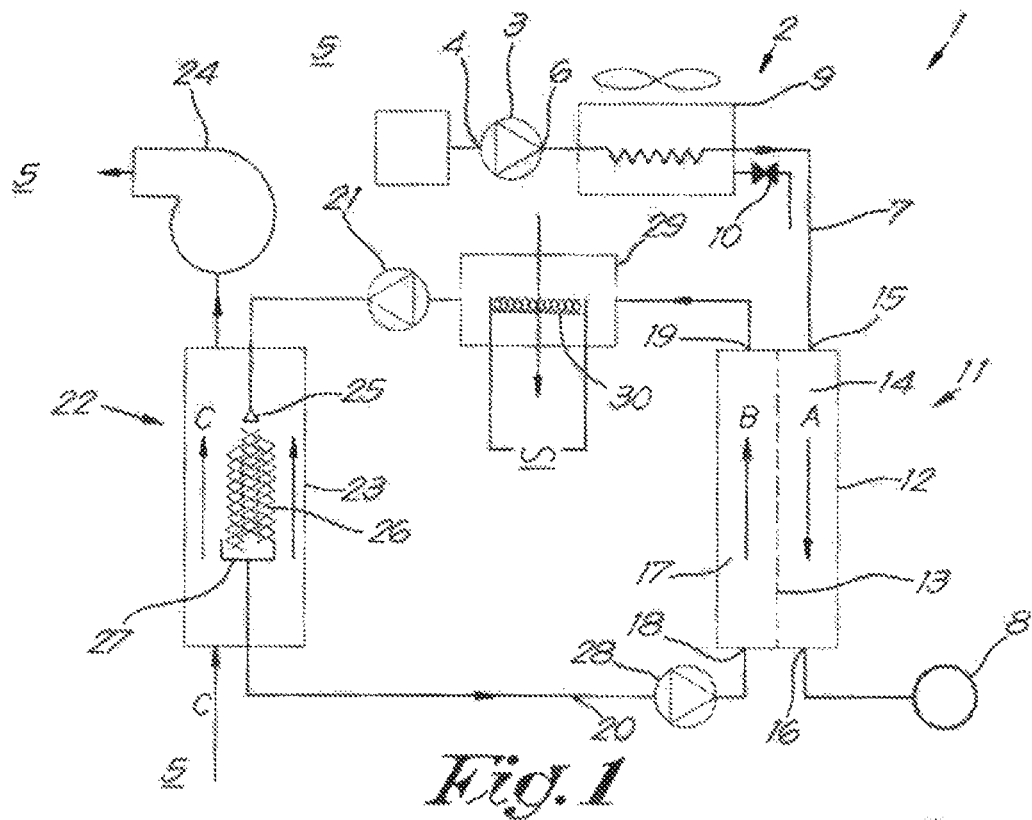
FIG. 1 schematically shows a compressor installation according to the invention with a device according to the invention to dry a compressed gas originating from a compressor.

The device shown in FIG. 1 is a compressor installation 1 which contains a device 2 to dry gas according to the invention.

The compressor installation 1 contains a compressor element 3 with an input 4 connected to an air filter through which a gas, in this case ambient air 5, can be drawn in, and an output 6 to which a pressure conduit 7 is connected to provide the gas compressed by the compressor element 3 at a high pressure to a user network 8 of non-illustrated pneumatic drills, percussion hammers or other tools or devices.

In the pressure conduit 7 an aftercooler 9 is integrated in the known manner to cool the compressed gas before it is supplied to the user network 8. Water present in the compressed gas condenses upon cooling in the aftercooler 9 and is carried off via a condensation separator 10.

The device 2 for drying gas contains a membrane dryer 11 that is included downstream from the aftercooler 9 in the pressure conduit 7 and is composed of a housing 12 which is divided into two compartments or channels using a flat membrane 13, respectively in a first compartment 14 with an input 15 and an output 16 for the compressed gas that is guided from the aftercooler 9 in the direction of arrow A through said first compartment 14 to the user network 8, and in a second compartment 17 with an input 18 and an output 19 for the liquid desiccant.

The device 2 to dry gas also contains a circuit 20 in which the second compartment 17 of the membrane dryer 11 is included and in which the liquid desiccant is circulated using a pump 21 across the second compartment 17 in the direction of arrow B, in the opposite direction to arrow A.

The liquid desiccant must be capable of absorbing moisture from the compressed gas and is preferably highly hygroscopic, in other words attracting moisture, and is characterised by a vapour pressure for water that is lower than the vapour pressure of the moisture in the compressed gas to be dried under the prevailing pressure and temperature in the circuit when the device is in operation.

Examples of suitable liquid desiccants are MPG; DPG; TPG; MEG; DEG; TEG; LiCl; LiBr and $CaCl_2$, or combinations thereof with the possible addition of water. However, this list is non-exhaustive.

The membrane 13 in the membrane dryer 11 has the characteristic of being impermeable or virtually impermeable to the gas in the compressed gas but selectively permeable to the moisture in the form of water vapour in the compressed gas.

The membrane 13 is preferably made of a hydrophobic, in other words water-repellent, microporous material with pores of between approximately fifteen nanometres and one hundred nanometres.

Examples of such material are summarised below in a non-exhaustive list of materials, namely PP (polypropene); PTFE (polytetrafluoroethene); PVDF (polyvinylidene fluoride); PES (polyethersulfone); porous PEI (polyetherimide); microporous PE (polyethene); PDMS (polydimethylsiloxane) and PI (polyimide).

Ceramic materials, such as titanium dioxide, can also be used as a material for the membrane in the membrane dryer, as well as combinations of ceramic and plastic materials.

Furthermore, the device 2 to dry gas contains a regenerator 22 which is included in the circuit 20 and is made in the form of a housing 23 through which ambient air from the environment 5 is drawn in as a flushing gas using a ventilator or blower 24 or suchlike in the direction of arrow C.

The liquid desiccant is guided by the circuit 20 through the regenerator 22 in an opposite direction to arrow C and atomised at the top using a sprayer 25 in the regenerator 22 on a contactor 26 along which and/or through which the ambient air flows into contact with the atomised desiccant, whereby the moisture absorbed in the desiccant is absorbed by the flushing gas and blown back into the environment 5 together with the absorbed moisture.

The liquid desiccant is collected at the bottom in a tray 27 from which the liquid desiccant is pumped back into the circuit 20 using a second pump 28.

With the installation of the blower 24, a slight negative pressure prevails in the regenerator 22, but there may also be a slight positive pressure when the blower 24 blows ambient air through the regenerator.

In the circuit 20, downstream from the membrane dryer 11 and upstream from the regenerator 22, a heat exchanger 29 is provided to heat the liquid desiccant originating from the membrane dryer 11.

In the illustrated example of FIG. 1, the heat exchanger 29 contains an electrical resistance 30.

Operation of the compressor installation 1 is very simple and as follows.

When in operation, the compressor element 3 provides a certain flow of damp compressed gas, whereby the gas is guided through the aftercooler 9 where the gas is cooled and where part of the moisture present in the gas is removed from the gas as condensate via the condensation separator 10.

The compressed gas is then guided with a relative humidity of 100% through the membrane dryer 11 where the compressed gas is brought via the membrane 13 into contact with the liquid desiccant on the other side of the membrane 13 for the purposes of transferring moisture.

In doing so, the moisture from the compressed gas diffuses through the membrane 13 and is absorbed there by the liquid desiccant, potentially supported by the pressure difference between the two sides of the membrane 13.

By heating in the heat exchanger 29, the water vapour pressure in the desiccant is increased. After passing through the heat exchanger 29, the liquid desiccant is guided through the regenerator 22 where it is brought into direct contact with the flushing gas, in this case ambient air. The flushing gas extracts moisture absorbed in the desiccant from the desiccant as the vapour pressure in the heated desiccant is now higher than in the flushing gas. Subsequently, the flushing gas is evacuated by the blower 24 together with the moisture extracted from the desiccant from the device 2 for drying gas and blown into the environment 5. The suction effect of the blower 24 also creates a negative pressure in the regenerator 22 which means that the flushing gas can remove moisture even more efficiently from the desiccant.

By heating the desiccant to for example 90° C., the absorption of moisture by the flushing gas is encouraged.

The low-moisture liquid desiccant collected in the tray 27 is then again guided through the membrane dryer 11 to once again extract moisture from the compressed gas.

In this way, the liquid desiccant is circulated continuously in the circuit 20 and moisture is continuously extracted from the compressed gas whereby the gas leaving the membrane dryer 11 is dried compressed gas.

Figure 2:
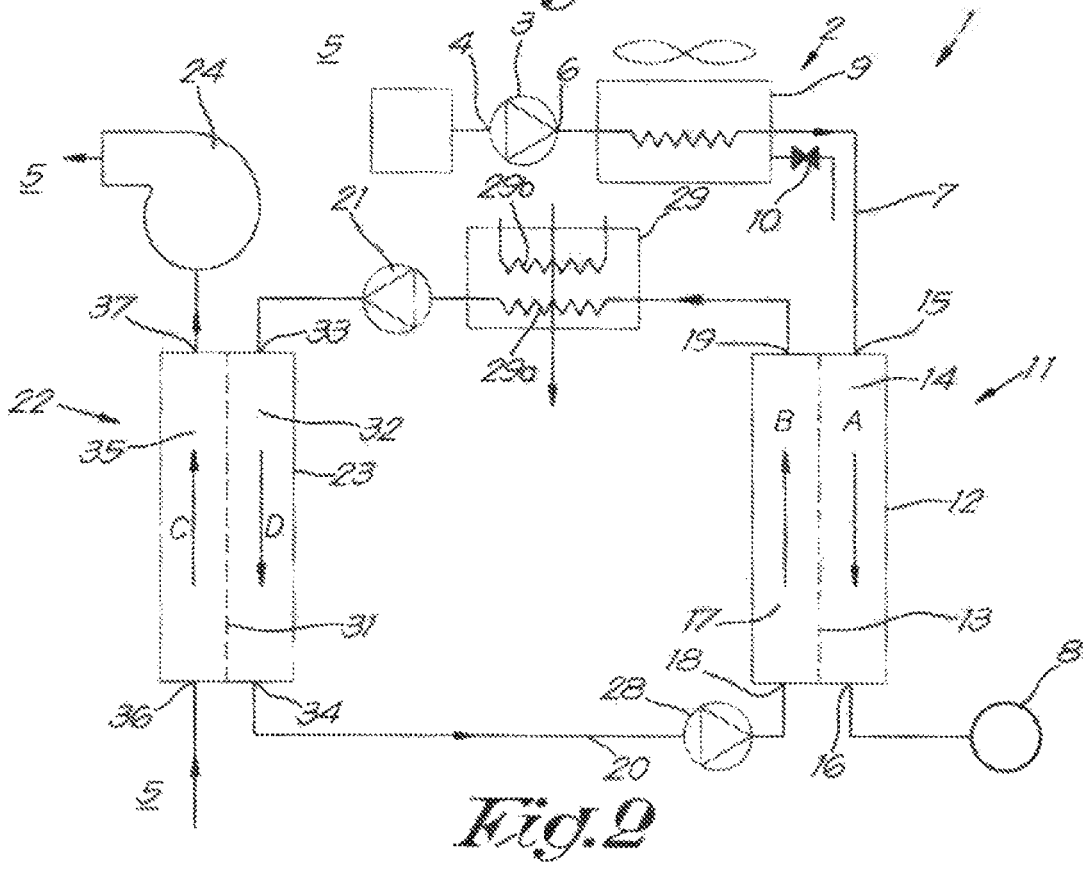

The variation on the compressor installation 1 according to the invention shown in FIG. 2 is comparable to the compressor installation 1 in FIG. 1, however, with the following two differences:
- in this case the heat exchanger 29 is a heat exchanger with a primary part 29a through which the liquid desiccant flows and a secondary part 29b that is in contact for heat-exchange purposes with the primary part 29a and through which a warm medium is guided during operation;
- the regenerator contains a membrane 31 that divides the housing 23 into two compartments, these being a first compartment 32 with an input 33 and an output 34 through which the liquid desiccant, after being heated in the heat exchanger 29, is sent in the direction of arrow D, and a second compartment 35 with an input 36 and an output 37 through which the flushing gas is sucked in in the direction of arrow C in a counterflow using the blower 24.

The membrane 31 is impermeable or virtually impermeable to the liquid desiccant but is selectively permeable to the moisture that is absorbed in the membrane dryer 11 by the liquid desiccant.

This membrane is preferably made of a hydrophobic material, for example PP (polypropene); PTFE (polytetrafluoroethene) or PVDF (polyvinylidene fluoride).

Otherwise the operation of this variant device is comparable to that of the device according to FIG. 1 with the difference that in this case the contact between the liquid desiccant and the flushing gas in the regenerator 22 occurs not directly but indirectly via the membrane 31.

Figure 3:
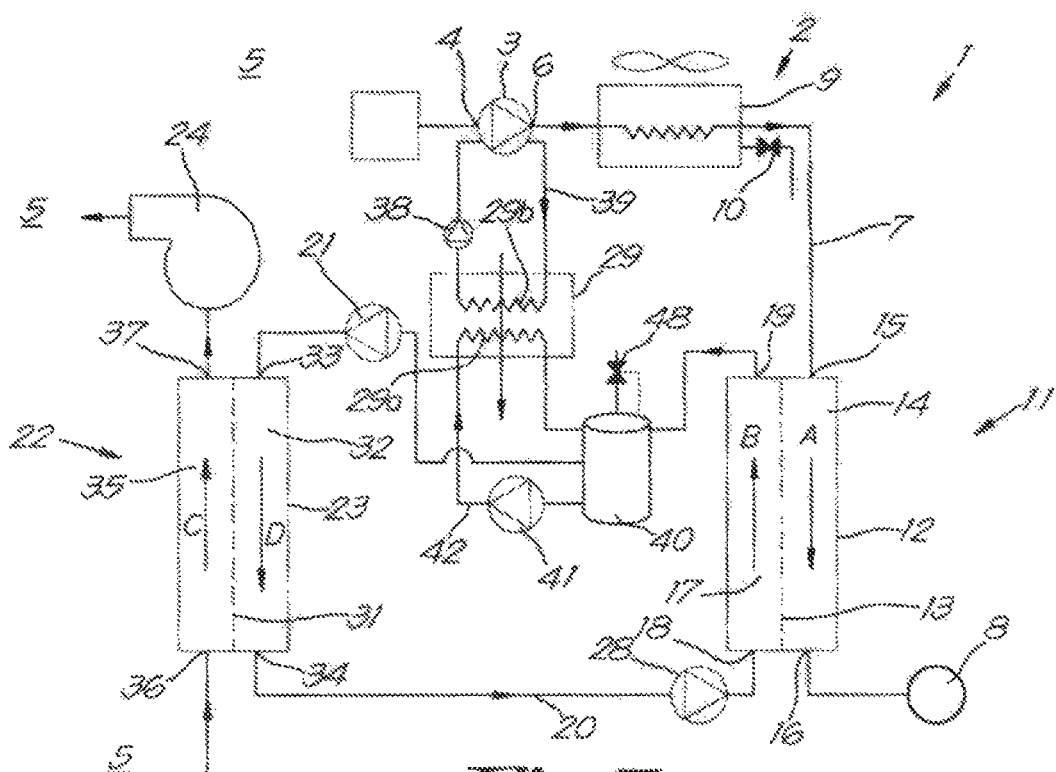

FIG. 3 is the improved variant of a compressor installation 1 according to the invention, whereby in this case the residual heat from the compressor element 3 is used to heat the liquid desiccant in the heat exchanger 29.

This can be done for example by allowing a cooling medium to circulate using a circulation pump 38 through a cooling jacket on the compressor element 3 in a closed circuit 39 in which the secondary part 29b of the heat exchanger 29 is also included.

In addition, a buffer vessel 40 is included in the circuit 20 for the liquid desiccant that comes from the membrane dryer 11 and that is charged with moisture.

The liquid desiccant is guided from this buffer vessel 40 using a circulation pump 41 in a closed circuit 42 through the primary part 29a of the heat exchanger 29 whereby the device reacts more stably to changes in operating conditions.

The buffer vessel 40 can be provided with an automatic deaerator 48, or air vent, which is responsible for venting the circuit 20 in the event that the membrane 13 in the membrane dryer 11 also allows gas from the compressed gas to flow through it, whereby the pressure in the circuit 20 may increase which may negatively affect the drying capacity of the device and whereby gas might even accumulate in certain parts of the circuit 20 and may cause hindrance or even blockage of the flow of the desiccant, which can lead to poor or even non-performance of the device 1.

Another possibility to recover the residual heat from the compressor element 3 is in the case of an oil-injected compressor element with an oil circuit used to inject oil in the compressor element for the lubrication and cooling of the compressor element 3.

In this case the warm oil can be used in the circuit 39 to heat up the liquid desiccant.

In oil-injected compressor elements, there is typically a very small amount of oil present in the compressed gas.

Depending on the material from which the membrane 13 in the membrane dryer 11 is made, it may be necessary to provide this membrane 13 with an oil-repellent or oil-proof protective layer.

If the membrane 13 is made from microporous plastic, such as for example PP, PE, PEI, PES, PI, PDMS, PTFE or PVDF a protective layer made for example of silicone may be applied or an amorphous protective layer made of a fluoropolymer, such as for example Teflon™, which for example is particularly recommended in the case of a membrane made of microporous PTFE.

Figure 4:
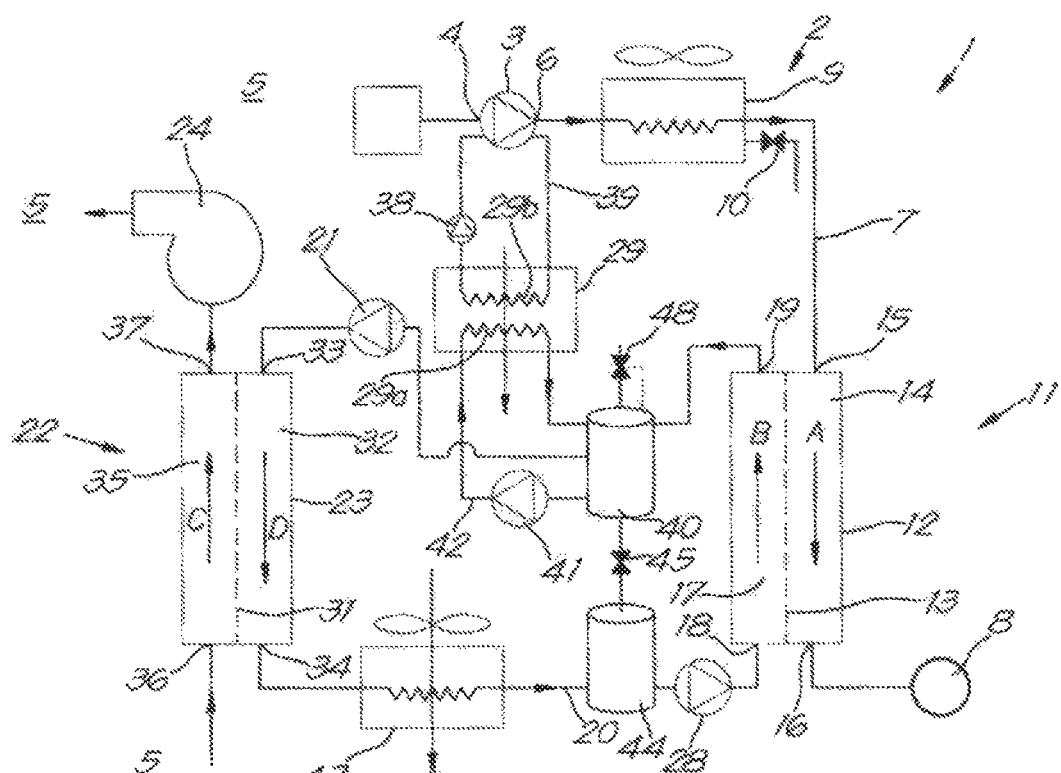

In FIG. 4, a further variant is shown of a compressor installation 1 according to the invention which differs from the compressor installation in FIG. 3 in the fact that a cooler 43 is included in the circuit 20 downstream from the regenerator 22 and upstream from the membrane dryer 11 and that a buffer vessel 44 is present to buffer the low-moisture cooled liquid desiccant originating from the cooler 43.

Between the buffer vessel 40 of the moisture-rich liquid desiccant and the buffer vessel 44 of the low-moisture liquid desiccant a closable bypass 45 is provided that can be used when starting up the device to dry gas 2 to become operational more quickly.

In doing so, it is not precluded that the buffer vessel 44 for buffering the low-moisture liquid desiccant is set up upstream from the cooler 43 and downstream from the regenerator 22. The cooler 43 is then located upstream directly before the membrane dryer 11. In this way, the liquid desiccant remains in the buffer vessels 40 and 44 at a higher temperature, causing the vapour pressure of the liquid desiccant to be higher which results in a more efficient regeneration of the liquid desiccant.

Figure 5:
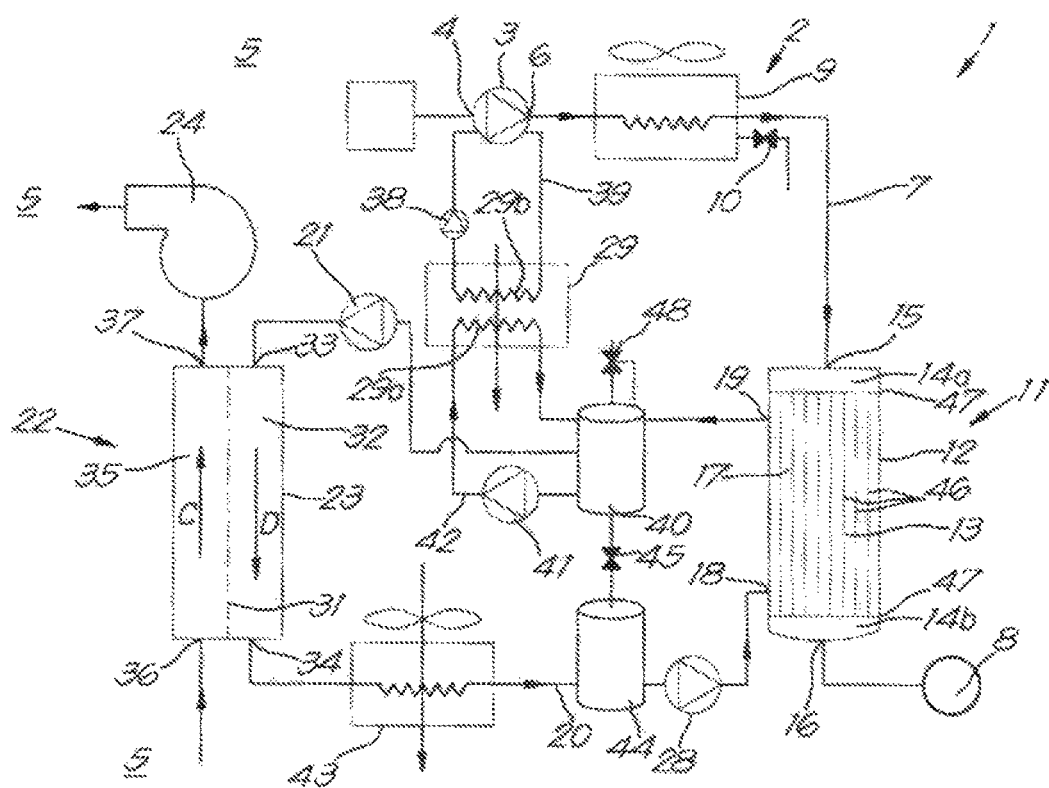

In FIG. 5, a further variant is shown that differs from the device in FIG. 4 in the fact that the membrane dryer 11 in the case of FIG. 5 has no flat membrane 13, but rather a membrane 13 that is composed of various tubular membranes, for example in the form of hollow fibres 46.

Hereto the housing 12 is provided with two partitions 47 which delimit a second compartment 17 with an input 18 and an output 19 for the liquid desiccant and two sub-compartments 14a and 14b, respectively with an input 15 and an output 16 for the compressed gas, whereby the two sub-compartments 14a and 14b are fluidly connected by the aforementioned fibres 46 which extend across the compartment 17 and through which the compressed gas is led from the sub-compartment 14a to the sub-compartment 14b and in doing so passes its moisture to the liquid desiccant through the walls of the hollow fibres 46.

Analogously, the regenerator can be provided with tubular or fibre-shaped membranes as opposed to a flat membrane 31.

Figure 6:
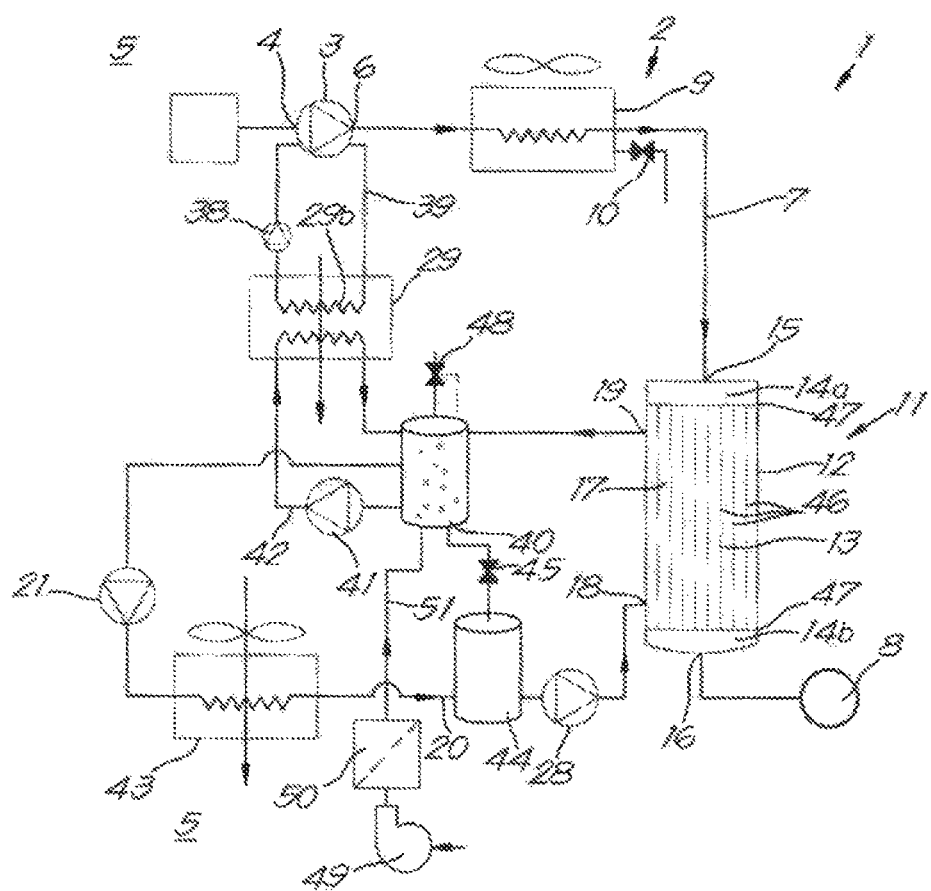

In FIG. 6, a further variant is shown that differs from the device in FIG. 4 in the fact that no separate regenerator 22 is included in the circuit 20. In this case regeneration of the desiccant is done by blowing air through the desiccant. In FIG. 6, it is shown how this can be achieved by blowing air in the buffer vessel 40, but another or additional vessel may also be used to this purpose. Using a blower or ventilator, air is blown through a filter 50 and guided via a conduit 51 in the vessel 40. The filter 50 is not essential and can also be integrated in a different way. The filter 50 prevents dust or other contaminants from being blown in the desiccant. At the point where the conduit 51 enters the vessel 40, all kinds of known means, for example fine bubbles, can be provided to achieve the desired distribution, for example fine bubbles, of the air blown into the desiccant in the buffer vessel 40, for example diffusers made from tubes or membranes provided with fine openings, or made from porous materials. The air bubbles will extract some of the moisture from the desiccant and carry this off as water vapour. In this way, the desiccant can be regenerated in a very simple manner.

The present invention is by no means limited to the embodiments described as example and shown in the drawings, but a device and a method according to the invention to dry compressed gas and a compressor installation provided with such a device can be realised in all kinds of embodiments without departing from the scope of the invention.

The invention claimed is:

1. A device to dry a damp compressed gas, whereby the device (2) is provided with a dryer that is provided with a liquid desiccant and configured to bring compressed gas in contact with the desiccant that is capable of absorbing moisture from the compressed gas, wherein:
    the dryer is a membrane dryer (11);
    the device (2) to dry compressed gas contains a circuit (20) in which the liquid desiccant is placed and means to allow the circulation of the desiccant in the circuit (20), consecutively through the membrane dryer (11) with a membrane (13) that forms a partition between the compressed gas on one side and the liquid desiccant on the other side of the membrane (13), whereby the membrane (13) is impermeable or virtually impermeable to the gas in the compressed gas but selectively permeable to the moisture in the compressed gas; a heat exchanger (29) to heat up the liquid desiccant; a regenerator (22) used to remove at least partially the moisture absorbed in the liquid desiccant before this is returned through the membrane dryer (11) for a following cycle, whereby the regenerator (22) is formed by a housing (23) through which the liquid desiccant with the moisture absorbed therein is guided in moisture-transfer contact with a flushing agent that is simultaneously guided through the housing (23) and is capable of absorbing moisture from the liquid desiccant upon contact; and
    the circuit (20) is provided with a closable bypass (45) between a branching point in the circuit downstream from the regenerator (22) and upstream from the membrane dryer (11) and a confluence point in the circuit downstream from the membrane dryer (11) and upstream from the regenerator (22).

2. The device according to claim 1, further comprising adjusting means configured to keep the pressure on the side of the compressed gas equal to or higher than the pressure on the side of the liquid desiccant, whereby the pressure difference between the two sides of the membrane (13) in the membrane dryer (11) is greater than two bar.

3. The device according claim 1, wherein the liquid desiccant contains at least one of the following substances:
    mono-propylene glycol;
    dipropylene glycol;
    tripropylene glycol;
    mono-ethylene glycol;
    di-ethylene glycol;
    tri-ethylene glycol;
    lithium chloride with chemical formula LiCl;
    lithium bromide with chemical formula LiBr;
    calcium chloride with chemical formula CaCl2.

4. The device according to claim 1, wherein the material of the membrane (13) in the membrane dryer (11) is
    a hydrophobic material with virtually no pores; and/or
    made of a microporous material with pores of a size approximately between fifteen nanometres and one hundred nanometres.

5. The device according to claim 1, wherein the material of the membrane (13) in the membrane dryer (11) is selected from the group consisting of:
    polypropene;
    polytetrafluoroethene;
    polyvinylidene fluoride;
    polyethersulfone;
    polyetherimide;
    polyethene;
    polydimethylsiloxane;
    polyimide;
    titanium dioxide with chemical formula $TiO_2$.

6. The device according to claim 1, wherein the membrane dryer (11) is made of a housing (12) with an input (15) for the gas to be dried and an output (16) for the dried gas and a separate compartment (17) in the housing (12) with an input (18) and output (19) for the liquid desiccant, whereby the membrane dryer (11) is made of a housing (12) and one or more tubular membranes that extend across the compartment (17) in the housing (12) and which connect the input (15) and the output (16) for the compressed gas to be dried.

7. The device according to claim 1, wherein the membrane (13) of the membrane dryer (11) is provided with
an oil-repellent or oil-proof protective layer, and/or
a layer of silicone or fluoropolymer.

8. The device according to claim 1, wherein the regenerator (22) is a membrane regenerator with a membrane (31) with on one side the liquid desiccant and with the flushing agent on the other side, whereby the membrane (31) is impermeable or virtually impermeable to the liquid desiccant but selectively permeable to the moisture that is absorbed in the membrane dryer (11) by the liquid desiccant,
whereby the membrane (31) in the regenerator (22) is made of a hydrophobic material.

9. The device according to claim 8, wherein the regenerator (22) contains a housing (23) with an input (33) and output (34) for the desiccant and a separate compartment (35) in the housing (23) with an input (36) and output (37) for the flushing gas,
whereby the regenerator (22) contains one or more tubular membranes which extend across the separated compartment (35) in the housing (23) and connect the input (33) and the output (34) for the desiccant.

10. The device according claim 1, wherein the regenerator (22) is a vessel connected to the circuit (20) of the liquid desiccant and that is configured to blow air through the desiccant and carry it away.

11. The device according to claim 1, wherein the circuit (20) of the liquid desiccant is provided with a cooler (43) downstream from the regenerator (22) and upstream from the membrane dryer (11), whereby
the circuit (20) of the liquid desiccant is provided with a buffer vessel (44) for cooled liquid desiccant originating from the cooler (43) downstream from the regenerator (22); or
the circuit (20) of the liquid desiccant is provided with a buffer vessel (44) for liquid desiccant originating from the regenerator (22) downstream from the regenerator (22) and upstream from the cooler (43).

12. The device according to claim 1, wherein the circuit (20) of the liquid desiccant is provided with a buffer vessel (40) for liquid desiccant originating from the membrane dryer (11), whose liquid desiccant is heated in the buffer vessel (40) by allowing it to circulate through the heat exchanger (29).

13. The device according to claim 1, wherein the circuit (20) of the liquid desiccant is provided with a deaerator (48), whereby the deaerator (48) is connected to a buffer vessel (40, 44) for the desiccant, and
the bypass (45) is provided between both buffer vessels (40, 44).

14. The device according to claim 1, wherein the means to allow circulation of the desiccant comprise at least one pump (21, 28).

15. A compressor installation with at least one compressor element (3) for the compression of gas, wherein the compressor installation (1) contains a device (2) according to claim 1 to dry compressed gas originating from the compressor element (3),
whereby this contains an aftercooler (9) downstream from the compressor element (3) to cool the compressed gas to be dried before being guided through the membrane dryer (11), and
the aftercooler (9) contains a condensation separator (10).

16. The compressor installation according to claim 15, wherein the heat exchanger (29) makes use of the residual heat in the compressor element (3) to heat the liquid desiccant upstream from the regenerator (22),
whereby
the compressor element (3) comprises a cooling jacket and whereby a cooling medium is guided consecutively through the cooling jacket and the heat exchanger (29) in order to heat the liquid desiccant; and/or
at least some of the heat removed in the aftercooler (9) is used to heat the liquid desiccant.

17. A method to dry a damp compressed gas, wherein the method comprises the following steps:
providing a membrane dryer (11) with a membrane (13) that is impermeable or virtually impermeable to the gas in the compressed gas but selectively permeable to the moisture in the compressed gas;
allowing the circulation of a liquid desiccant through the membrane dryer (11) on one side of the membrane (13) that is capable of absorbing moisture from the compressed gas to be dried upon contact;
sending the gas to be dried along the other side of the membrane (13) through the membrane dryer (11) at a pressure that is higher than the pressure on the side of the liquid desiccant;
heating the liquid desiccant once it has been guided through the membrane dryer (11);
regenerating the liquid desiccant to remove at least some of the moisture absorbed therein before it is recirculated in a following cycle through the membrane dryer (11) by bringing it in contact with a flushing agent that is capable of absorbing moisture from the liquid desiccant upon contact,
and some of the regenerated liquid desiccant is sent via a closable bypass (45) in an open position and is subsequently further regenerated without passing the membrane dryer (11).

18. The method according to claim 17, wherein the chosen flushing agent for the regeneration of the liquid desiccant is
a flushing liquid that contains water and brought into contact with the liquid desiccant to be regenerated; or
a flushing gas that contains air and is brought into contact with the liquid desiccant to be regenerated,
whereby the flushing gas is ambient air that is brought into contact with the liquid desiccant to be regenerated at atmospheric pressure,
the regeneration of the desiccant use is made of a regenerator (22) through which the liquid desiccant to be regenerated is guided and brought into contact with the ambient air which is sucked in or blown through the regenerator (22).

19. The method according to claim 17, wherein the method is aligned to reach a dew point of the dried compressed gas lying between −20° C. and +10° C.

* * * * *